(12) United States Patent
Wang et al.

(10) Patent No.: US 10,052,861 B2
(45) Date of Patent: Aug. 21, 2018

(54) INKS FOR 3D PRINTING

(71) Applicant: 3D Systems, Incorporated, Rock Hill, SC (US)

(72) Inventors: Patricia Wang, Lake Oswego, OR (US); Pingyong Xu, Valencia, CA (US); Jule W. Thomas, Jr., West Linn, OR (US); Michael B. Meinhardt, Lake Oswego, OR (US)

(73) Assignee: 3D Systems, Inc., Rock Hill, SC (US)

( * ) Notice: Subject to any disclaimer, the term of this patent is extended or adjusted under 35 U.S.C. 154(b) by 601 days.

(21) Appl. No.: 14/644,701

(22) Filed: Mar. 11, 2015

(65) Prior Publication Data

US 2015/0259548 A1    Sep. 17, 2015

Related U.S. Application Data

(60) Provisional application No. 61/950,906, filed on Mar. 11, 2014, provisional application No. 61/978,795, filed on Apr. 11, 2014.

(51) Int. Cl.
| | |
|---|---|
| *C09D 11/10* | (2014.01) |
| *C09D 11/102* | (2014.01) |
| *C09D 11/32* | (2014.01) |
| *C09D 11/324* | (2014.01) |
| *B33Y 50/02* | (2015.01) |
| *G05B 19/4093* | (2006.01) |
| *C09D 11/101* | (2014.01) |
| *C09D 11/322* | (2014.01) |
| *B29C 64/106* | (2017.01) |
| *B29C 64/112* | (2017.01) |
| *B29C 64/165* | (2017.01) |
| *B29C 64/386* | (2017.01) |
| *B33Y 10/00* | (2015.01) |
| *B33Y 70/00* | (2015.01) |
| *B33Y 80/00* | (2015.01) |
| *B29L 9/00* | (2006.01) |

(52) U.S. Cl.
CPC ............ *B33Y 50/02* (2014.12); *B29C 64/106* (2017.08); *B29C 64/112* (2017.08); *B29C 64/165* (2017.08); *B29C 64/386* (2017.08); *C09D 11/101* (2013.01); *C09D 11/322* (2013.01); *G05B 19/4093* (2013.01); *B29K 2995/0021* (2013.01); *B29L 2009/005* (2013.01); *B33Y 10/00* (2014.12); *B33Y 70/00* (2014.12); *B33Y 80/00* (2014.12); *Y10T 428/269* (2015.01); *Y10T 428/31551* (2015.04)

(58) Field of Classification Search
CPC ... B29C 64/106; B29C 64/112; B29C 64/386; B33Y 10/00; B33Y 50/00; B33Y 50/02; C09D 11/10; C09D 11/101; C09D 11/102; C09D 11/32; C09D 11/322; C09D 11/324

USPC ........................................................ 264/308
See application file for complete search history.

(56) References Cited

U.S. PATENT DOCUMENTS

| | | | |
|---|---|---|---|
| 7,427,317 B2 | 9/2008 | Sloan | |
| 7,431,759 B2 | 10/2008 | Sloan | |
| 7,578,958 B2 | 8/2009 | Patel et al. | |
| 7,662,224 B2 | 2/2010 | Sloan | |
| 8,142,860 B2 | 3/2012 | Vanmaele et al. | |
| 8,282,197 B2 | 10/2012 | De Voeght et al. | |
| 8,287,112 B2 | 10/2012 | Van Thillo et al. | |
| 8,480,203 B2 | 7/2013 | Van Thillo et al. | |
| 8,529,049 B2 | 9/2013 | De Voeght et al. | |
| 8,757,789 B2 | 6/2014 | Van Thillo et al. | |
| 9,004,663 B2 | 4/2015 | Van Thillo et al. | |
| 9,458,333 B2 | 10/2016 | Hall et al. | |
| 9,556,346 B2 | 1/2017 | Suzuki et al. | |
| 2006/0222831 A1 | 5/2006 | Sloan | |
| 2011/0045199 A1 | 2/2011 | Cong | |
| 2013/0234370 A1 | 9/2013 | Suzuki et al. | |
| 2014/0162033 A1* | 6/2014 | Giller | B29C 64/106 428/207 |
| 2016/0263826 A1 | 9/2016 | Suzuki et al. | |
| 2016/0264796 A1 | 9/2016 | Suzuki et al. | |

FOREIGN PATENT DOCUMENTS

| | | |
|---|---|---|
| JP | 2004-538184 | 12/2004 |
| JP | 2009-533484 | 9/2009 |
| JP | 2010-521330 | 6/2010 |
| JP | 2012-111226 | 6/2012 |
| JP | 2012-525445 | 10/2012 |
| WO | 94/09078 | 4/1994 |
| WO | 03/016030 | 2/2003 |
| WO | 2007/046275 | 4/2007 |
| WO | 2008/077850 | 7/2008 |
| WO | 2008/114240 | 9/2008 |
| WO | 2010/125373 | 11/2010 |

OTHER PUBLICATIONS

PCT International Preliminary Report on Patentability for PCT/US2015/019910, dated Sep. 22, 2016 (8 pages).
PCT International Search Report the International Searching Authority for PCT/US2015/019910, dated May 8, 2015 (5 pages).
PCT Written Opinion of the International Searching Authority for PCT/US2015/019910, dated May 8, 2015 (6 pages).
First Office Action for Japanese Patent Application No. 2016-554600, dated Sep. 5, 2017 (3 pages).

* cited by examiner

*Primary Examiner* — Leo B Tentoni

(57) ABSTRACT

In one aspect, inks for use with a three-dimensional printing system are described herein. In some embodiments, an ink described herein is a composite ink. Such a composite ink, in some cases, comprises an optically transparent or substantially transparent carrier ink comprising a curable material; and a colorant dispersed in the carrier ink in an amount of about 0.01 to 5 weight %, based on the total weight of the composite ink.

5 Claims, 4 Drawing Sheets

INKS FOR 3D PRINTING

CROSS REFERENCE TO RELATED APPLICATIONS

This application claims priority pursuant to 35 U.S.C. § 119 to U.S. Provisional Patent Application Ser. No. 61/950,906, filed on Mar. 11, 2014, and to U.S. Provisional Patent Application Ser. No. 61/978,795, filed on Apr. 11, 2014, each of which is hereby incorporated by reference in its entirety.

FIELD

The present invention relates to inks and, in particular, to pigmented inks for use with three-dimensional (3D) printing systems.

BACKGROUND

Commercially available 3D printers, such as the ProJet™ 3D Printers manufactured by 3D Systems of Rock Hill, S.C., use inks, which are also known as build materials, that are jetted through a print head as a liquid to form various 3D objects or parts. Other 3D printing systems also use an ink that is jetted through a print head. In some instances, the ink is solid at ambient temperatures and converts to liquid at elevated jetting temperatures. In other instances, the ink is liquid at ambient temperatures.

Some inks can include one or more colorants or pigments to provide colored printed parts. However, many such inks are much more highly pigmented than necessary or desired to provide colored printed parts. Moreover, the presence of pigments in many inks can interfere with the jettability, stability, and/or curability of the inks. In addition, the pigment load of some pigmented inks can require different types and/or amounts of photoinitiators to obtain appropriate curing of inks having different colors, which can result in decreased efficiency and/or increased cost of a 3D printing process.

Therefore, there exists a need for improved inks for 3D printing, including for colored 3D printing applications.

SUMMARY

In one aspect, inks for use with a 3D printer are described herein which, in some embodiments, may offer one or more advantages over prior inks. In some embodiments, for example, an ink described herein provides printed parts that have improved chroma or chromaticity. In addition, in some cases, an ink described herein is a curable ink having excellent jettability and/or high colloidal stability.

In some embodiments, an ink for use in a 3D printing system described herein is a composite ink. A composite ink, in some instances, comprises an optically transparent or substantially transparent carrier ink comprising a curable material; and a colorant dispersed in the carrier ink in an amount of about 0.01 to 5 weight %, based on the total weight of the composite ink. Further, in some cases, a chroma of the composite ink at a given thickness of the composite ink is within about 20% of a maximum chroma of the colorant in the composite ink. Moreover, the colorant of a composite ink described herein can be a particulate pigment or a molecular dye. Further, in some embodiments, the carrier ink of a composite ink described herein has an optical transparency of at least about 70% transmission, at least about 80% transmission, or at least about 90% transmission between 350 nm and 750 nm, all at a given thickness, such as a thickness between about 0.01 and 10 mm, between about 1 and 10 mm, between about 0.2 and 1 mm, between about 0.3 and 0.8 mm, between about 1 and 5 mm, or between about 5 and 10 mm. Additionally, in some instances, a composite ink described herein further comprises one or more additives selected from the group consisting of photoinitiators, inhibitors, stabilizing agents, sensitizers, and combinations thereof.

In another aspect, methods of printing a 3D article are described herein. In some embodiments, a method of printing a 3D article comprises selectively depositing layers of a composite ink described herein in a fluid state onto a substrate. For example, in some cases, the composite ink comprises an optically transparent or substantially transparent carrier ink comprising a curable material; and a colorant dispersed in the carrier ink in an amount of about 0.01 to 5 weight %, based on the total weight of the composite ink. Further, the layers of a composite ink can be deposited according to an image of the 3D article in a computer readable format. Moreover, in some cases, one or more layers of a composite ink described herein has a thickness of about 0.03 to about 5 mm.

In addition, in some embodiments, a method described herein further comprises supporting at least one of the layers of the composite ink with a support material. A method described herein can also comprise curing the layers of the composite ink.

In another aspect, printed 3D articles are described herein. In some embodiments, a printed 3D article is formed from a composite ink described herein, such as a composite ink comprising an optically transparent or substantially transparent carrier ink comprising a curable material; and a colorant dispersed in the carrier ink in an amount of about 0.01 to 5 weight %, based on the total weight of the composite ink.

In other embodiments, a printed 3D article comprises a core component comprising a plurality of layers formed from an opaque ink; and a shell component comprising a plurality of layers disposed over a surface of the core component. At least one layer of the shell component is formed from a composite ink described herein, such as a composite ink comprising an optically transparent or substantially transparent carrier ink comprising a curable material; and a colorant dispersed in the carrier ink in an amount of about 0.01 to 5 weight %, based on the total weight of the composite ink. Moreover, in some instances, at least one layer of the shell component formed from a composite ink has a thickness of about 0.03 to about 5 mm.

Further, in some cases, an article described herein can comprise a shell component formed from a plurality of differing inks in a layer-by-layer manner, where the plurality of differing inks can include a plurality of differing composite inks described herein. For example, in some embodiments, the shell component of an article described herein comprises one or more layers formed from a first composite ink comprising a first optically transparent or substantially transparent carrier ink comprising a curable material, and a first colorant dispersed in the first carrier ink in an amount of about 0.01 to 5 weight %, based on the total weight of the first composite ink; and one or more layers formed from a second composite ink comprising a second optically transparent or substantially transparent carrier ink comprising a curable material, and a second colorant dispersed in the second carrier ink in an amount of about 0.01 to 5 weight %, based on the total weight of the second composite ink. In such cases, the first composite ink and the second composite ink can be different inks. For example, in some embodiments, the chemical identity and/or amount of the first colorant of the first composite ink can differ from the chemical identity and/or amount of the second colorant of the second composite ink.

These and other embodiments are described in greater detail in the detailed description which follows.

DETAILED DESCRIPTION

Figure 1:
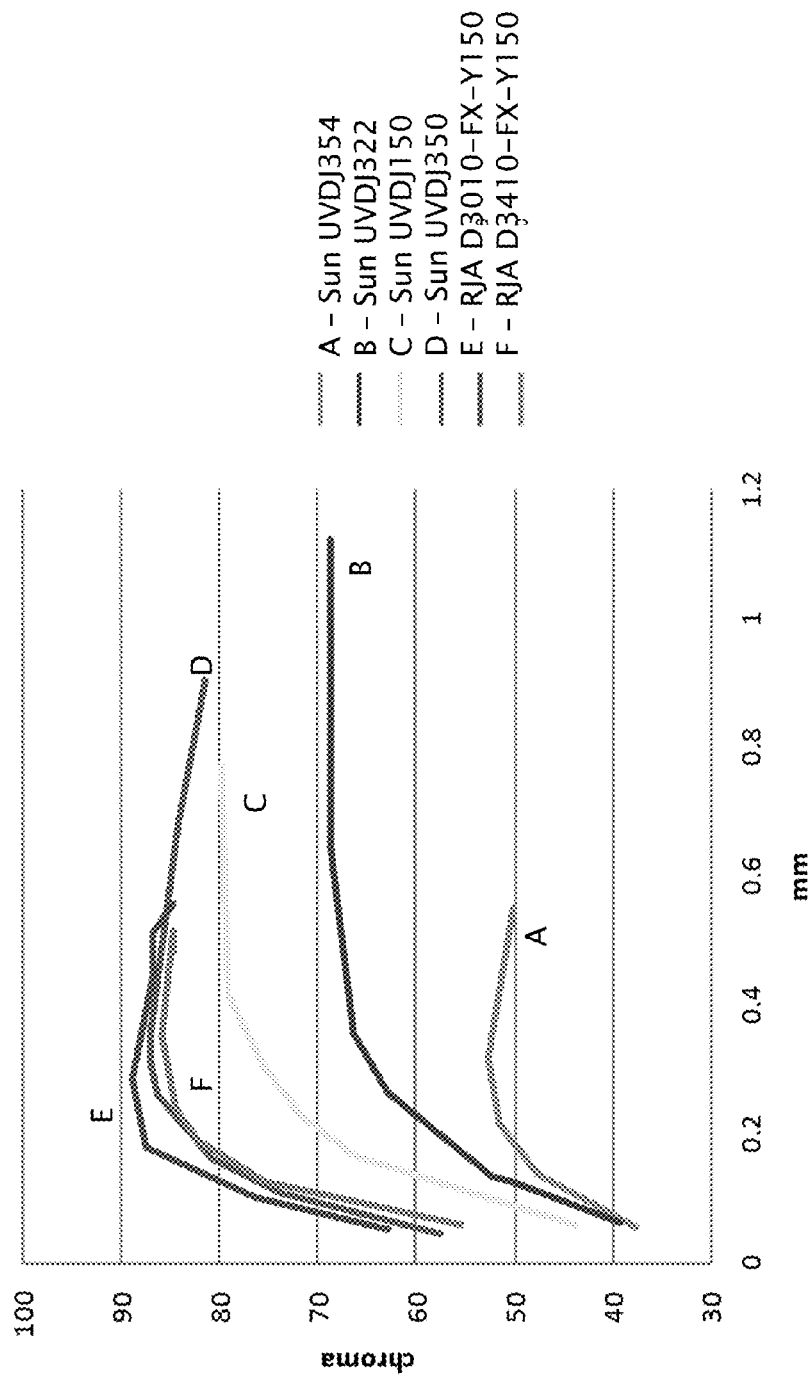
FIG. 1 illustrates plots of chroma versus layer thickness for various pigments dispersed in a carrier ink.

Embodiments described herein can be understood more readily by reference to the following detailed description, examples, and drawings. Elements, apparatus and methods described herein, however, are not limited to the specific embodiments presented in the detailed description, examples, and drawings. It should be recognized that these embodiments are merely illustrative of the principles of the present invention. Numerous modifications and adaptations will be readily apparent to those of skill in the art without departing from the spirit and scope of the invention.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

All ranges disclosed herein are also to be considered to include the end points of the range, unless expressly stated otherwise. For example, a range of "between 5 and 10" should generally be considered to include the end points 5 and 10.

Further, when the phrase "up to" is used in connection with an amount or quantity, it is to be understood that the amount is at least a detectable amount or quantity. For example, a material present in an amount "up to" a specified amount can be present from a detectable amount and up to and including the specified amount.

The terms "three-dimensional printing system," "three-dimensional printer," "printing," and the like generally describe various solid freeform fabrication techniques for making three-dimensional articles or objects by selective deposition, jetting, fused deposition modeling, multijet modeling, and other additive manufacturing techniques now known in the art or that may be known in the future that use a build material or ink to fabricate three-dimensional objects.

I. Composite Inks

In one aspect, composite inks for use with a 3D printer are described herein. In some embodiments, a composite ink described herein comprises an optically transparent or substantially transparent carrier ink comprising a curable material; and a colorant dispersed in the carrier ink in an amount of about 0.01 to 5 weight %, based on the total weight of the composite ink. In some cases, the colorant is present in the carrier ink in an amount between about 0.01 and 3 weight %, between about 0.01 and 1 weight %, between about 0.05 and 5 weight %, between about 0.05 and 3 weight %, between about 0.05 and 1 weight %, between about 0.1 and 5 weight %, between about 0.1 and 3 weight %, or between about 0.1 and 1 weight %.

Further, in some cases, a chroma of the composite ink at a given thickness of the composite ink is within about 20%, within about 15%, within about 10%, or within about 5% of a maximum chroma of the colorant in the composite ink. The "chroma" of a composite ink or colorant, for reference purposes herein, refers to the radial component of the polar coordinates of the color of the composite ink or colorant in chromaticity space, such as the CIE 1931 chromaticity space. Further, in some embodiments, a maximum chroma of a composite ink or colorant can be a function of the thickness of the composite ink, including the thickness of a layer formed by the composite ink in a manner described herein. Thus, in some embodiments, the colorant loading of a composite ink described herein can be selected to maximize the chroma of the composite ink, including for a specific desired layer thickness of the composite ink.

Moreover, the colorant of a composite ink described herein can be a particulate colorant, such as a particulate pigment, or a molecular colorant, such as a molecular dye. Any such particulate or molecular colorant not inconsistent with the objectives of the present disclosure may be used. In some cases, for instance, the colorant of a composite ink comprises an inorganic pigment, such as $TiO_2$ and ZnO. In some embodiments, the colorant of a composite ink comprises a colorant for use in a RGB, sRGB, CMY, CMYK, L*a*b*, or Pantone® colorization scheme. Moreover, in some cases, a particulate colorant described herein has an average particle size of less than 500 nm, such as an average particle size of less than 400 nm, less than 300 nm, less than 250 nm, less than 200 nm, or less than 150 nm. In some instances, a particulate colorant has an average particle size of 50-1000 nm, 50-500 nm, 50-400 nm, 50-300 nm, 50-200 nm, 70-500 nm, 70-300 nm, 70-250 nm, or 70-200 nm.

Further, in some embodiments, the carrier ink of a composite ink described herein can have a high optical transparency, including in the visible region of the electromagnetic spectrum. In some cases, for instance, the carrier ink has an optical transparency of at least about 70% transmission, at least about 80% transmission, at least about 90% transmission, or at least about 95% transmission between about 350 nm and about 750 nm, at a given thickness, such as a thickness of about 0.01 to 10 mm, about 0.2 to 1 mm, about 0.3 to 0.8 mm, about 1 to 10 mm, about 1 to 5 mm, or about 5 to 10 mm. In some cases, a carrier ink has a transparency of at least about 98% or at least about 99% transmission between about 350 nm and about 750 nm, at a given thickness, such as a thickness of about 0.01 to 10 mm, about 0.2 to 1 mm, about 0.3 to 0.8 mm, about 1 to 10 mm, about 1 to 5 mm, or about 5 to 10 mm. Moreover, in some instances, a carrier ink described herein has an optical transparency between about 70% and about 95%, between about 80% and about 99.99%, or between about 90% and about 95% transmission at wavelengths between about 350 nm and about 750 nm, at a given thickness, such as a thickness of 0.1 to 10 mm, about 0.2 to 1 mm, about 0.3 to 0.8 mm, about 1 to 10 mm, about 1 to 5 mm, or about 5 to 10 mm. Carrier inks having an optical transparency described herein can facilitate use of the composite inks in 3D printing colorization processes wherein the perceived color of a 3D printed article is based on the dithering or halftoning of discrete colors in the z-direction of the part, which is orthogonal or substantially orthogonal to the surface of the part, rather than in the x- and y-directions along the surface of the part.

In addition, carrier inks described herein comprise a curable material. The curable material can be present in the carrier ink in any amount not inconsistent with the objectives of the present disclosure. In some cases, the curable material is present in an amount up to about 99 weight %, up to about 95 weight %, up to about 90 weight %, or up to about 80 weight %, based on the total weight of the carrier ink. In some cases, a composite ink described herein comprises about 10-95 weight % curable material, based on the total weight of the carrier ink. In some embodiments, a carrier ink comprises about 20-80 weight % curable material, about 30-70 weight % curable material, or about 70-90 weight % curable material.

Moreover, any curable material not inconsistent with the objectives of the present disclosure may be used. In some cases, a curable material comprises one or more polymerizable components. A "polymerizable component," for reference purposes herein, comprises a component that can be polymerized or cured to provide a 3D printed article or object. Polymerizing or curing can be carried out in any manner not inconsistent with the objectives of the present disclosure. In some embodiments, for instance, polymerizing or curing comprises irradiating with electromagnetic radiation having sufficient energy to initiate a polymerization or cross-linking reaction. For instance, in some embodiments, ultraviolet (UV) radiation can be used.

Further, any polymerizable component not inconsistent with the objectives of the present disclosure may be used. In some embodiments, a polymerizable component comprises a monomeric chemical species, such as a chemical species having one or more functional groups or moieties that can react with the same or different functional groups or moieties of another monomeric chemical species to form one or more covalent bonds, such as in a polymerization reaction. A polymerization reaction, in some embodiments, comprises a free radical polymerization, such as that between points of unsaturation, including points of ethylenic unsaturation. In some embodiments, a polymerizable component comprises at least one ethyleneically unsaturated moiety, such as a vinyl group or allyl group. In some embodiments, a polymerizable component comprises an oligomeric chemical species capable of undergoing additional polymerization, such as through one or more points of unsaturation as described herein. In some embodiments, a polymerizable component comprises one or more monomeric chemical species and one or more oligomeric chemical species described herein. A monomeric chemical species and/or an oligomeric chemical species described herein can have one polymerizable moiety or a plurality of polymerizable moieties.

In some embodiments, a polymerizable component comprises one or more photo-polymerizable or photo-curable chemical species. A photo-polymerizable chemical species, in some embodiments, comprises a UV-polymerizable chemical species. In some embodiments, a polymerizable component is photo-polymerizable or photo-curable at wavelengths ranging from about 300 nm to about 400 nm. Alternatively, in some embodiments, a polymerizable component is photo-polymerizable at visible wavelengths of the electromagnetic spectrum.

In some embodiments, a polymerizable component described herein comprises one or more species of (meth)acrylates. As used herein, the term "(meth)acrylate" includes acrylate or methacrylate or mixtures or combinations thereof. In some embodiments, a polymerizable component comprises an aliphatic polyester urethane acrylate oligomer, a urethane (meth)acrylate resin, and/or an acrylate amine oligomeric resin, such as EBECRYL 7100. In some embodiments, a UV polymerizable or curable resin or oligomer can comprise any methacrylate or acrylate resin which polymerizes in the presence of a free radical photoinitiator, is thermally stable in an exposed state for at least one week at a jetting temperature and for at least 4 weeks in an enclosed state, and/or has a boiling point greater than the jetting temperature. In some embodiments, a polymerizable component has a flash point above the jetting temperature.

Urethane (meth)acrylates suitable for use in inks described herein, in some embodiments, can be prepared in a known manner, typically by reacting a hydroxyl-terminated urethane with acrylic acid or methacrylic acid to give the corresponding urethane (meth)acrylate, or by reacting an isocyanate-terminated prepolymer with hydroxyalkyl acrylates or methacrylates to give the urethane (meth)acrylate. Suitable processes are disclosed, inter alia, in EP-A 114 982 and EP-A 133 908. The weight average molecular weight of such (meth)acrylate oligomers is generally in the range from about 400 to 10,000, or from about 500 to 7,000. Urethane (meth)acrylates are also commercially available from the SARTOMER Company under the product names CN980, CN981, CN975 and CN2901, or from Bomar Specialties Co. (Winsted, Conn.) under the product name BR-741. In some embodiments described herein, a urethane (meth)acrylate oligomer has a viscosity ranging from about 140,000 cP to about 160,000 cP at about 50° C. or from about 125,000 cP to about 175,000 cP at about 50° C. when measured in a manner consistent with ASTM D2983. In some embodiments described herein, a urethane (meth)acrylate oligomer has a viscosity ranging from about 100,000 cP to about 200,000 cP at about 50° C. or from about 10,000 cP to about 300,000 cP at about 50° C. when measured in a manner consistent with ASTM D2983.

In some embodiments, a polymerizable component comprises one or more low molecular weight materials, such as methacrylates, dimethacrylates, triacrylates, and diacrylates, which can be used in a variety of combinations. In some embodiments, for example, a polymerizable component comprises one or more of tetrahydrofurfuryl methacrylate, triethylene glycol dimethacrylate, 2-phenoxyethyl methacrylate, lauryl methacrylate, ethoxylated trimethylolpropane triacrylate, tricyclodecane dimethanol diacrylate, 2-phenoxyethylacrylate, triethylene glycol diacrylate, a monofunctional aliphatic urethane acrylate, polypropylene glycol monomethacrylate, polyethylene glycol monomethacrylate, cyclohexane dimethanol diacrylate, and tridecyl methacrylate.

In some embodiments, a polymerizable component comprises diacrylate and/or dimethacrylate esters of aliphatic, cycloaliphatic or aromatic diols, including 1,3- or 1,4-butanediol, neopentyl glycol, 1,6-hexanediol, diethylene glycol, triethylene glycol, tetraethylene glycol, polyethylene glycol, tripropylene glycol, ethoxylated or propoxylated neopentyl glycol, 1,4-dihydroxymethylcyclohexane, 2,2-bis(4-hydroxycyclohexyl)propane or bis(4-hydroxycyclohexyl)methane, hydroquinone, 4,4'-dihydroxybiphenyl, bisphenol A, bisphenol F, bisphenol S, ethoxylated or propoxylated bisphenol A, ethoxylated or propoxylated bisphenol F or ethoxylated or propoxylated bisphenol S.

A polymerizable component, in some embodiments, comprises one or more tri(meth)acrylates. In some embodiments, tri(meth)acrylates comprise 1,1-trimethylolpropane triacrylate or methacrylate, ethoxylated or propoxylated 1,1,1-trimethylolpropanetriacrylate or methacrylate, ethoxylated or propoxylated glycerol triacrylate, pentaerythritol monohydroxy triacrylate or methacrylate, or tris(2-hydroxy ethyl) isocyanurate triacrylate.

In some embodiments, a polymerizable component of an ink described herein comprises one or more higher functional acrylates or methacrylates such as dipentaerythritol monohydroxy pentaacrylate or bis(trimethylolpropane) tetraacrylate. In some embodiments, a (meth)acrylate of an ink has a molecular weight ranging from about 250 to 700.

In some embodiments, a polymerizable component comprises allyl acrylate, allyl methacrylate, methyl (meth)acrylate, ethyl (meth)acrylate, n-propyl (meth)acrylate, n-butyl (meth)acrylate, isobutyl (meth)acrylate, n-hexyl (meth)acrylate, 2-ethylhexyl (meth)acrylate, n-octyl (meth)acrylate, n-decyl (meth)acrylate and n-dodecyl (meth)acrylate, 2-hydroxyethyl (meth)acrylate, 2- and 3-hydroxypropyl (meth)acrylate, 2-methoxyethyl(meth)acrylate, 2-ethoxyethyl (meth)acrylate and 2- or 3-ethoxypropyl (meth)acrylate, tetrahydrofurfuryl methacrylate, 2-(2-ethoxyethoxyl)ethyl acrylate, cyclohexyl methacrylate, 2-phenoxyethyl acrylate, glycidyl acrylate, isodecyl acrylate, or a combination thereof.

Additional non-limiting examples of species of polymerizable components useful in some embodiments described herein include the following: isobornyl acrylate (IBOA), commercially available from SARTOMER under the trade name SR 506A; isobornyl methacrylate, commercially available from SARTOMER under the trade name SR 423A; alkoxylated tetrahydrofurfuryl acrylate, commercially available from SARTOMER under the trade name SR 611; monofunctional urethane acrylate, commercially available from RAHN USA under the trade name GENOMER 1122; aliphatic urethane diacrylate, commercially available from ALLNEX under the trade name EBECRYL 8402; triethylene glycol diacrylate, commercially available from SARTOMER under the trade name SR 272; triethylene glycol dimethacrylate, commercially available from SARTOMER under the trade name SR 205; tricyclodecane dimethanol diacrylate, commercially available from SARTOMER under the trade name SR 833S; tris(2-hydroxy ethyl)isocyanurate triacrylate, commercially available from SARTOMER under the trade name SR 368; and 2-phenoxyethyl acrylate, commercially available from SARTOMER under the trade name SR 339. Other commercially available curable materials may also be used.

Carrier inks described herein, in some embodiments, further comprise one or more additives. In some embodiments, a carrier ink described herein further comprises one or more additives selected from the group consisting of photoinitiators, inhibitors, stabilizing agents, sensitizers, and combinations thereof. For example, in some embodiments, an ink further comprises one or more photoinitiators. Any photoinitiator not inconsistent with the objectives of the present disclosure can be used. In some embodiments, a photoinitiator comprises an alpha-cleavage type (unimolecular decomposition process) photoinitiator or a hydrogen abstraction photosensitizer-tertiary amine synergist, operable to absorb light preferably between about 250 nm and about 400 nm or between about 300 nm and about 385 nm, to yield free radical(s).

Examples of alpha cleavage photoinitiators are Irgacure 184 (CAS 947-19-3), Irgacure 369 (CAS 119313-12-1), and Irgacure 819 (CAS 162881-26-7). An example of a photosensitizer-amine combination is Darocur BP (CAS 119-61-9) with diethylaminoethylmethacrylate.

In some embodiments, suitable photoinitiators comprise benzoins, including benzoin, benzoin ethers, such as benzoin methyl ether, benzoin ethyl ether and benzoin isopropyl ether, benzoin phenyl ether and benzoin acetate, acetophenones, including acetophenone, 2,2-dimethoxyacetophenone and 1,1-dichloroacetophenone, benzil, benzil ketals, such as benzil dimethyl ketal and benzil diethyl ketal, anthraquinones, including 2-methylanthraquinone, 2-ethylanthraquinone, 2-tert-butylanthraquinone, 1-chloroanthraquinone and 2-amylanthraquinone, triphenylphosphine, benzoylphosphine oxides, for example 2,4,6-trimethylbenzoyldiphenylphosphine oxide (Lucirin TPO), benzophenones, such as benzophenone and 4,4'-bis(N,N'-dimethylamino)benzophenone, thioxanthones and xanthones, acridine derivatives, phenazine derivatives, quinoxaline derivatives or 1-phenyl-1,2-propanedione, 2-O-benzoyl oxime, 1-aminophenyl ketones or 1-hydroxyphenyl ketones, such as 1-hydroxycyclohexyl phenyl ketone, phenyl 1-hydroxyisopropyl ketone and 4-isopropylphenyl 1-hydroxyisopropyl ketone.

In some cases, suitable photoinitiators comprise those operable for use with a HeCd laser radiation source, including acetophenones, 2,2-dialkoxybenzophenones and 1-hydroxyphenyl ketones, such as 1-hydroxycyclohexyl phenyl ketone or 2-hydroxyisopropyl phenyl ketone (=2-hydroxy-2,2-dimethylacetophenone). Additionally, in some instances, suitable photoinitiators comprise those operable for use with an Ar laser radiation source including benzil ketals, such as benzil dimethyl ketal. In some embodiments, a photoinitiator comprises an α-hydroxyphenyl ketone, benzil dimethyl ketal or 2,4,6-trimethylbenzoyldiphenylphosphine oxide or a mixture thereof.

Another class of suitable photoinitiators, in some cases, comprises ionic dye-counter ion compounds capable of absorbing actinic radiation and generating free radicals for polymerization initiation. In some embodiments, inks containing ionic dye-counter ion compounds can be cured more variably with visible light within the adjustable wavelength range of about 400 nm to about 700 nm. Some ionic dye-counter ion compounds and their mode of operation are disclosed in EP-A-0 223 587 and U.S. Pat. Nos. 4,751,102; 4,772,530; and 4,772,541.

A photoinitiator can be present in an ink described herein in any amount not inconsistent with the objectives of the present disclosure. In some embodiments, a photoinitiator is present in an ink in an amount of up to about 5 weight percent, based on the total weight of the ink. In some embodiments, a photoinitiator is present in an amount ranging from about 0.1 weight percent to about 5 weight percent.

In some embodiments, an ink further comprises one or more sensitizers. A sensitizer can be added to an ink to increase the effectiveness of one or more photoinitiators that may also be present. Any sensitizer not inconsistent with the objectives of the present disclosure may be used. In some embodiments, a sensitizer comprises isopropylthioxanthone (ITX). In some embodiments, a sensitizer comprises 2-chlorothioxanthone (CTX).

A sensitizer can be present in an ink in any amount not inconsistent with the objectives of the present disclosure. In some embodiments, a sensitizer is present in an amount ranging from about 0.1 weight percent to about 2 weight percent, based on the total weight of the ink. A sensitizer, in some embodiments, is present in an amount ranging from about 0.5 weight percent to about 1 weight percent.

In addition, an ink described herein, in some embodiments, further comprises one or more polymerization inhibitors or stabilizing agents. A polymerization inhibitor can be added to an ink to provide additional thermal stability to the composition. Any polymerization inhibitor not inconsistent with the objectives of the present disclosure may be used. In some cases, a polymerization inhibitor comprises methoxyhydroquinone (MEHQ). A stabilizing agent, in some embodiments, comprises one or more anti-oxidants. A stabilizing agent can comprise any anti-oxidant not inconsistent with the objectives of the present disclosure. In some cases, suitable anti-oxidants include various aryl compounds, including butylated hydroxytoluene (BHT), which can also be used as a polymerization inhibitor in some embodiments described herein.

A polymerization inhibitor and/or a stabilizing agent can be present in an ink in any amount not inconsistent with the objectives of the present disclosure. In some embodiments, a polymerization inhibitor is present in an amount ranging from about 0.1 wt. % to about 2 wt. % or from about 0.5 wt. % to about 1 wt. %. Similarly, in some cases, a stabilizing agent is present in an ink in an amount ranging from about 0.1 wt. % to about 5 wt. %, from about 0.5 wt. % to about 4 wt. %, or from about 1 wt. % to about 3 wt. %, based on the total weight of the ink.

Composite inks described herein can also exhibit a variety of other desirable properties. For example, a composite ink described herein can have any freezing point, melting point, and/or other phase transition temperature not inconsistent with the objectives of the present disclosure. In some embodiments, an ink has freezing and melting points consistent with temperatures used in some 3D printing systems, including 3D printing systems designed for use with phase changing inks. In some embodiments, the freezing point of an ink is greater than about 40° C. In some embodiments, for example, an ink has a freezing point centered at a temperature ranging from about 45° C. to about 55° C. or from about 50° C. to about 80° C. In some embodiments, an ink has a freezing point below about 40° C. or below about 30° C.

Further, in some embodiments described herein, a composite ink exhibits a sharp freezing point or other phase transition. In some cases, for instance, an ink freezes over a narrow range of temperatures, such as a range of about 1-10° C., about 1-8° C., or about 1-5° C. In some embodiments, an ink having a sharp freezing point freezes over a temperature range of X±2.5° C., where X is the temperature at which the freezing point is centered (e.g., X=65° C.).

In addition, a composite ink described herein, in some cases, is fluid at jetting temperatures encountered in 3D printing systems. Moreover, in some embodiments, an ink solidifies once deposited on a surface during the fabrication of a three-dimensionally printed article or object. Alternatively, in other embodiments, an ink remains substantially fluid upon deposition on a surface. Solidification of an ink, in some embodiments, occurs through a phase change of the ink, such as freezing. The phase change can comprise a liquid to solid phase change or a liquid to semi-solid phase change. Further, in some instances, solidification of an ink comprises an increase in viscosity, such as an increase in viscosity from a low viscosity state to a high viscosity state.

In some embodiments, a composite ink described herein has a viscosity profile consistent with the requirements and parameters of one or more 3D printing systems. In some embodiments, for instance, an ink described herein has a viscosity ranging from about 8.0 cP to about 14.0 cP at a temperature of about 80° C. when measured according to ASTM standard D2983 (e.g., using a Brookfield Model DV-II+ Viscometer). In some embodiments, an ink has a viscosity ranging from about 9.5 cP to about 12.5 cP at a temperature of about 80° C. An ink, in some embodiments, has a viscosity ranging from about 10.5 cP to about 12.5 cP at a temperature of about 80° C. In some embodiments, an ink has a viscosity ranging from about 8.0 cP to about 10.0 cP at a temperature of about 85-87° C.

In some embodiments, a composite ink described herein has a viscosity ranging from about 8.0 cP to about 19.0 cP at a temperature of about 65° C. measured according to ASTM standard D2983. In some embodiments, an ink described herein has a viscosity ranging from about 8.0 cP to about 13.5 cP at a temperature of about 65° C. An ink, in some embodiments, has a viscosity ranging from about 11.0 cP to about 14.0 cP at a temperature of about 65° C. In some embodiments, an ink has a viscosity ranging from about 11.5 cP to about 13.5 cP or from about 12.0 cP to about 13.0 cP at a temperature of about 65° C.

Further, composite inks described herein, in some embodiments, exhibit a combination of one or more desirable features. In some embodiments, for instance, a composite ink in the non-cured state has one or more of the following properties:

1. Freezing point between about 30° C. and about 65° C.;
2. jetting viscosity of about 8 cP to about 16 cP at 70-95° C.; and
3. Thermal stability for at least 3 days at the jetting temperature.

Viscosity can be measured according to ASTM D2983 (e.g., using a Brookfield Model DV-II+ Viscometer). In addition, for reference purposes herein, a "thermally stable" material exhibits no greater than about a 35 percent change in viscosity over a specified time period (e.g., 3 days) when measured at the specified temperature (e.g., a jetting temperature of 85° C.) at the beginning and at the end of the time period. In some embodiments, the viscosity change is no greater than about 30 percent or no greater than about 20 percent. In some embodiments, the viscosity change is between about 10 percent and about 20 percent or between about 25 percent and about 30 percent. Moreover, in some embodiments, the change in viscosity is an increase in viscosity.

Composite inks described herein can also exhibit a variety of desirable properties, in addition to those described hereinabove, in a cured state. A composite ink in a "cured" state, as used herein, comprises an ink that includes a curable material or polymerizable component that has been at least partially polymerized and/or cross-linked. For instance, in some embodiments, a cured ink is at least about 10% polymerized or cross-linked or at least about 30% polymerized or cross-linked. In some embodiments, a cured ink is at least about 50%, at least about 70%, at least about 80%, or at least about 90% polymerized or cross-linked. In some embodiments, a cured ink is between about 10% and about 99% polymerized or cross-linked.

Composite inks described herein, in some embodiments, can be produced in any manner not inconsistent with the objectives of the present disclosure. In some embodiments, for instance, a method for the preparation of an ink described herein comprises the steps of mixing the components of the ink, melting the mixture, and filtering the molten mixture. Melting the mixture, in some embodiments, is carried out at a temperature of about 75° C. or in a range from about 75° C. to about 85° C. In some embodiments, an ink described herein is produced by placing all components of the ink in a reaction vessel and heating the resulting mixture to a temperature ranging from about 75° C. to about 85° C. with stirring. The heating and stirring are continued until the mixture attains a substantially homogenized molten state. In general, the molten mixture can be filtered while in a flowable state to remove any large undesirable particles that may interfere with jetting. The filtered mixture is then cooled to ambient temperatures until it is heated in the ink jet printer.

II. Methods of Printing a 3D Article

In another aspect, methods of printing a 3D article or object are described herein. In some embodiments, a method of printing a 3D article comprises selectively depositing layers of a composite ink described herein in a fluid state onto a substrate. Any composite ink described hereinabove in Section I may be used. For example, in some cases, the composite ink comprises an optically transparent or substantially transparent carrier ink comprising a curable material; and a colorant dispersed in the carrier ink in an amount of about 0.01 to 5 weight %, based on the total weight of the composite ink. Further, the layers of a composite ink can be deposited according to an image of the 3D article in a computer readable format. In some embodiments, the ink is deposited according to preselected computer aided design (CAD) parameters.

Moreover, in some cases, one or more layers of a composite ink described herein have a thickness of about 0.03 to about 5 mm, a thickness of about 0.03 to about 3 mm, a thickness of about 0.03 to about 1 mm, a thickness of about 0.03 to about 0.5 mm, a thickness of about 0.03 to about 0.3 mm, a thickness of about 0.03 to about 0.2 mm, a thickness of about 0.05 to about 5 mm, a thickness of about 0.05 to about 1 mm, a thickness of about 0.05 to about 0.5 mm, a thickness of about 0.05 to about 0.3 mm, or a thickness of about 0.05 to about 0.2 mm. Other thicknesses are also possible.

Further, in some cases, the substrate of a method described herein comprises an opaque core component of the 3D article, including a core component formed from an opaque ink. Thus, in some embodiments, a method of printing a 3D article described herein comprises forming a core component from an opaque ink and forming a shell component on the surface of the core component, the shell comprising successive or sequentially stacked layers of a composite ink described herein. However, it is to be understood that the layers of the shell component may be stacked in a z-direction of the article, where the z-direction is normal or substantially normal to an exterior surface of the article. Moreover, the z-direction is not necessarily the direction of 3D printing, where the "direction" of 3D printing refers to the direction in which sequentially deposited layers of build material are built up to form the 3D article. Instead, the direction of 3D printing may be another direction, as needed or desired for printing a 3D article having a desired geometry and surface colorization. In general, an article described herein can be formed by defining a shell component and a core component of the article as part of a rendering step, prior to slicing of the article for 3D printing. Thus, in some instances, the thinnest dimension of the slices and/or sequentially deposited layers of the article may be oriented perpendicular to the z-direction, rather than parallel to the z-direction. In this case, a shell component described herein may be located at a perimeter of the sequentially deposited layers. Additionally, in some instances, the substrate of a method described herein can be a build pad of a 3D printing system.

An opaque ink or core component, in some embodiments, comprises an ink or core component that transmits no more than about 10% of incident light over a 1 centimeter (cm) path length. In some embodiments, an opaque ink or core component transmits no more than about 20% or no more than about 30% of incident light over a 1 cm path length. In some embodiments, an opaque ink or core component transmits less than about 5% of incident light over a 1 cm path length. Incident light, in some embodiments, comprises visible light. In some embodiments, the incident light comprises electromagnetic radiation having a wavelength from about 350 nm to about 750 nm, from about 400 nm to about 700 nm, from about 450 nm to about 600 nm, from about 450 nm to about 500 nm, from about 450 nm to about 550 nm, from about 500 nm to about 570 nm, from about 500 nm to about 600 nm, from about 600 nm to about 650 nm, from about 600 nm to about 700 nm, or from about 650 nm to about 750 nm. In addition, in some cases, an opaque ink or core component can be optically reflective, wherein at least about 10%, at least about 20%, or at least about 30% of incident visible light is reflected by the surface of the opaque ink or core component.

In addition, in some embodiments, a method described herein further comprises supporting at least one of the layers of the composite ink with a support material. Any support material not inconsistent with the objectives of the present disclosure may be used.

A method described herein can also comprise curing the layers of the composite ink. In some embodiments, a method of printing a 3D article further comprises subjecting the ink to electromagnetic radiation of sufficient wavelength and intensity to cure the ink, where curing can comprise polymerizing one or more polymerizable functional groups of one or more components of the ink. In some embodiments of printing a 3D article, a layer of deposited ink is cured prior to the deposition of another or adjacent layer of ink.

In some embodiments, a preselected amount of ink described herein is heated to the appropriate temperature and jetted through the print head or a plurality of print heads of a suitable inkjet printer to form a layer on a print pad in a print chamber. In some embodiments, each layer of ink is deposited according to the preselected CAD parameters. A suitable print head to deposit the ink, in some embodiments, is a piezoelectric print head. Additional suitable print heads for the deposition of ink and support material described herein are commercially available from a variety of ink jet printing apparatus manufacturers. For example, Xerox, Hewlett Packard, or Ricoh print heads may also be used in some instances.

In some embodiments comprising a method of printing a 3D article comprising a composite ink as described herein, the composite ink remains substantially fluid upon deposition. In other embodiments, the ink exhibits a phase change upon deposition and/or solidifies upon deposition. In some embodiments, the temperature of the printing environment can be controlled so that the jetted droplets of ink solidify on contact with the receiving surface. In other embodiments, the jetted droplets of ink do not solidify on contact with the receiving surface, remaining in a substantially fluid state. In some embodiments, after each layer is deposited, the deposited material is planarized and cured with electromagnetic (e.g., UV) radiation prior to the deposition of the next layer. Optionally, several layers can be deposited before planarization and curing, or multiple layers can be deposited and cured followed by one or more layers being deposited and then planarized without curing. Planarization corrects the thickness of one or more layers prior to curing the material by evening the dispensed material to remove excess material and create a uniformly smooth exposed or flat up-facing surface on the support platform of the printer. In some embodiments, planarization is accomplished with a wiper device, such as a roller, which may be counter-rotating in one or more printing directions but not counter-rotating in one or more other printing directions. In some embodiments, the wiper device comprises a roller and a wiper that removes excess material from the roller. In some embodiments, the wiper device is heated. It should be noted that the consistency of the jetted ink described herein prior to curing, in some embodiments, must be sufficient to retain its shape and not be subject to excessive viscous drag from the planarizer.

Moreover, a support material, in some embodiments, can be deposited in a manner consistent with that described herein for the ink. The support material, for example, can be deposited according to the preselected CAD parameters such that the support material is adjacent or continuous with one or more layers of the ink. Jetted droplets of the support material, in some embodiments, solidify or freeze on contact with the receiving surface. In some embodiments, the deposited support material is also subjected to planarization.

Layered deposition of the ink and support material can be repeated until the 3D article has been formed. In some embodiments, a method of printing a 3D article further comprises removing the support material from the ink.

III. 3D Printed Articles

In another aspect, printed 3D articles are described herein. In some embodiments, a printed 3D article is formed from a composite ink described herein. Any composite ink described hereinabove in Section I may be used. For example, in some cases, the composite ink comprises an optically transparent or substantially transparent carrier ink comprising a curable material; and a colorant dispersed in the carrier ink in an amount of about 0.01 to 5 weight %, based on the total weight of the composite ink.

In other embodiments, a printed 3D article comprises a core component comprising a plurality of layers formed from an opaque ink; and a shell component comprising a plurality of layers formed from a composite ink described herein. Any composite ink described hereinabove in Section I may be used. For example, in some embodiments, at least one layer of the shell component comprises an optically transparent or substantially transparent carrier ink comprising a curable material; and a colorant dispersed in the carrier ink in an amount of about 0.01 to 5 weight %, based on the total weight of the composite ink. Moreover, in some instances, the layer of the shell component formed from the composite ink has a thickness of about 0.03 to about 5 mm.

Further, in some embodiments, a 3D printed article described herein comprises a core component and a shell component disposed over the core component in a z-direction. In some cases, the shell component is formed or defined by a plurality of columns of voxels normal or substantially normal to a surface of the article. A direction that is "substantially" normal or perpendicular to a surface, plane, or to another direction, for reference purposes herein, is within about 15 degrees, within about 10 degrees, or within about 5 degrees of the normal direction. In addition, in some instances, at least one column of voxels exhibits a surface color resulting from a combination of colors of a plurality of voxels of the column, as described further hereinbelow.

"Color" values for a column of voxels can comprise color values for one voxel or more than one voxel within the column. Typically, the color values for a column of voxels include color values for all of the voxels in the column. In addition, the color values can be color values according to any colorization scheme not inconsistent with the objectives of the present disclosure, such as a RGB, sRGB, CMY, CMYK, L*a*b*, or Pantone® colorization scheme.

"Transparency" values for a column of voxels can comprise transparency values for one voxel or more than one voxel within the column. Typically, the transparency values for a column of voxels include transparency values for all of the voxels in the column. In addition, the transparency values can be transparency values according to any transparency-denoting scheme not inconsistent with the objectives of the present disclosure. For example, in some cases, transparency values are values between 0 (full transparency) and 1 (full opacity) on an "alpha" scale. Transparency values of voxel data can also correspond to the optical transparency of the voxel to light having a wavelength between about 350 nm and about 750 nm. For example, a voxel may have an optical transparency of less than about 30% transmission, less than about 50% transmission, less than about 70% transmission, greater than about 70% transmission, greater than about 80% transmission, greater than about 90% transmission, about 70-80% transmission, about 80-90% transmission, or about 90-100% transmission of incident light between 350 nm and 750 nm over the thickness of the voxel or over some other given thickness, such as a thickness between about 0.01 and 10 mm, between about 0.2 and 1 mm, between about 0.3 and 0.8 mm, between about 1 and 10 mm, between about 1 and 5 mm, or between about 5 and 10 mm.

The core component of an article described herein can be the innermost region of the article in the z-direction (which, as described above, is normal or substantially normal to an exterior surface of the article). Further, the core component of an article can have any color and/or other optical property not inconsistent with the objectives of the present disclosure. In some cases, for instance, the core component of an article described herein is black in color or white in color. Black-colored core components disposed below a shell component can serve to darken one or more colors exhibited or produced by the shell component. Other dark colors in addition to black may also be used. Similarly, a white-colored core component can serve to lighten one or more colors exhibited or produced by the overlying shell component. Further, light colors other than white may also be used to achieve a similar effect. Moreover, in some instances, the core component of an article described herein is opaque or optically reflective. A core component may also be translucent or transparent. In addition, in some embodiments, the core component of an article described herein is located or begins at least about 0.5 mm, at least about 1 mm, at least about 2 mm, at least about 3 mm, or at least about 4 mm beneath the exterior surface of the article.

As described above, the shell component of an article described herein can be formed or defined by a plurality of columns of voxels selected and arranged to provide a desired surface color or other visual surface effect. For instance, in some cases, at least one column of voxels includes voxels having different color values and/or different transparency values. The use of voxels within a single column having different color values and/or different transparency values can permit the column of voxels to exhibit a wide range of color values and/or other visual effects resulting from the combination of the visual characteristics of the individual voxels of the column. In this manner, full-color colorization schemes, dithering, and/or halftoning can be achieved by varying color in the z-direction of a 3D printed article. In some embodiments, a column of voxels includes translucent voxels and opaque voxels, and/or colored voxels and non-colored voxels. A colored voxel can be formed from a composite ink described herein, and a non-colored voxel can be formed from an ink or build material that does not comprise a colorant or to which one or more colorants have not been intentionally added.

Further, a shell component of an article described herein can have any depth or thickness not inconsistent with the objectives of the present disclosure. In some cases, a shell component has a depth or thickness of at least two voxels in the z-direction. In some embodiments, a shell component has a thickness of 2-32 voxels, 2-24 voxels, 2-16 voxels, 4-32 voxels, 4-24 voxels, or 4-16 voxels. Other depths or thicknesses are also possible. In some cases, the total depth or thickness of the shell component is between about 0.03 mm and about 3 mm, between about 0.05 mm and about 2.5 mm, or between about 0.05 mm and about 2 mm. The thickness or depth of a shell component described herein can be selected based on a desired color level and/or a desired color profile of the article in the z-direction.

It is to be understood that a "voxel" described herein can be any desired size, as desired or needed for a given visual effect, provided the 3D printing system used to form the voxel is capable of providing voxels of the desired size. The size of a voxel can also correspond to a volume of ink associated with a printing resolution or feature resolution of a 3D printing system used to carry out a method described herein. The "feature resolution" of an article or system, for reference purposes herein, can be the smallest controllable physical feature size of the article. The feature resolution of an article can be described in terms of a unit of distance such as microns (μm), or in terms of dots per inch (dpi). As understood by one of ordinary skill in the art, a higher feature resolution corresponds to a higher dpi value but a lower distance value in μm. In some cases, an article formed by jetting or extruding an ink described herein can have a feature resolution of about 500 μm or less, about 200 μm or less, about 100 μm or less, or about 50 μm or less. In some embodiments, an article has a feature resolution between about 50 μm and about 500 μm, between about 50 μm and about 200 μm, between about 50 μm and about 100 μm, or between about 100 μm and about 200 μm. Correspondingly, in some instances, an article described herein has a feature resolution of at least about 100 dpi, at least about 200 dpi, at least about 250 dpi, at least about 400 dpi, or at least about 500 dpi. In some cases, the feature resolution of an article is between about 100 dpi and about 600 dpi, between about 100 dpi and about 250 dpi, or between about 200 dpi and about 600 dpi. In some instances, a voxel described herein has a volume corresponding to the product of the feature resolution (in distance units such as microns) and a layer thickness described herein.

Further, in some cases, an article described herein can comprise a shell component formed from a plurality of differing inks, including a plurality of differing composite inks described herein. The inks can differ in a layer-by-layer manner or voxel-by-voxel manner. For example, in some embodiments, the shell component of an object described herein comprises one or more layers or voxels formed from a first composite ink comprising a first optically transparent or substantially transparent carrier ink comprising a curable material, and a first colorant dispersed in the first carrier ink in an amount of about 0.01 to 5 weight %, based on the total weight of the first composite ink; and one or more layers or voxels formed from a second composite ink comprising a second optically transparent or substantially transparent carrier ink comprising a curable material, and a second colorant dispersed in the second carrier ink in an amount of about 0.01 to 5 weight %, based on the total weight of the second composite ink. In such cases, the first composite ink and the second composite ink can be different inks. For example, in some embodiments, the chemical identity and/or amount of the first colorant of the first composite ink can differ from the chemical identity and/or amount of the second colorant of the second composite ink. In a similar manner, the shell component of an article described herein can comprise one or more layers or voxels formed from n composite inks that are the same or different from one another, where n can be up to 5, up to 10, up to 20, or more than 20.

Some embodiments described herein are further illustrated in the following non-limiting examples.

Example 1

Composite Inks

Composite inks according to some embodiments described herein were prepared as follows. Various commercial pigments were disposed in carrier inks described herein having an optical transparency of over 90% transmission. Specifically, the carrier inks included urethane (meth)acrylate oligomers (15-25 wt. %), non-oligomeric mono(meth)acrylates (28-42 wt. %), non-oligomeric di(meth)acrylates (28-36 wt. %), non-oligomeric tri(meth)acrylates (8-12 wt. %), stabilizer (0.1-0.2 wt. %), and photoinitiator (2-4 wt. %). The commercial pigments included Sun UVDJ354, Sun UVDJ322, Sun UVDJ150, Sun UVDJ350, RJA D3010-FX-Y150, RJA D3410-FX-Y150, and others provided in Table I below. The composite inks were then jetted into layers having various thicknesses and their chromatic properties measured. The chroma values of some composite inks as a function of layer thickness are plotted in FIG. 1. For a given colorant, the optimum absorption of light occurs at a certain amount of colorant. Above this optimum, the color can become too dark (when plotted lines begin curving downward). Below this optimum, the color can be too light.

Figure 2:
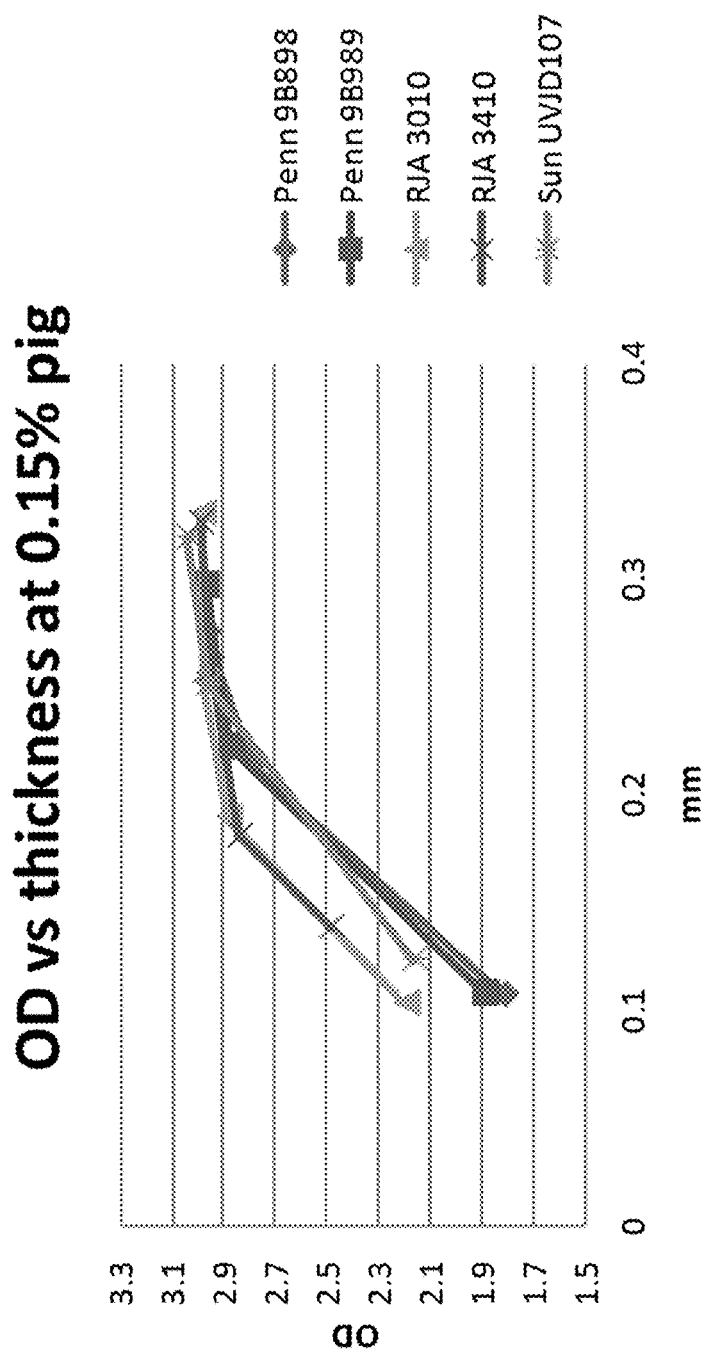
FIG. 2 illustrates plots of optical density versus layer thickness for various pigments dispersed in a carrier ink.
Figure 3:
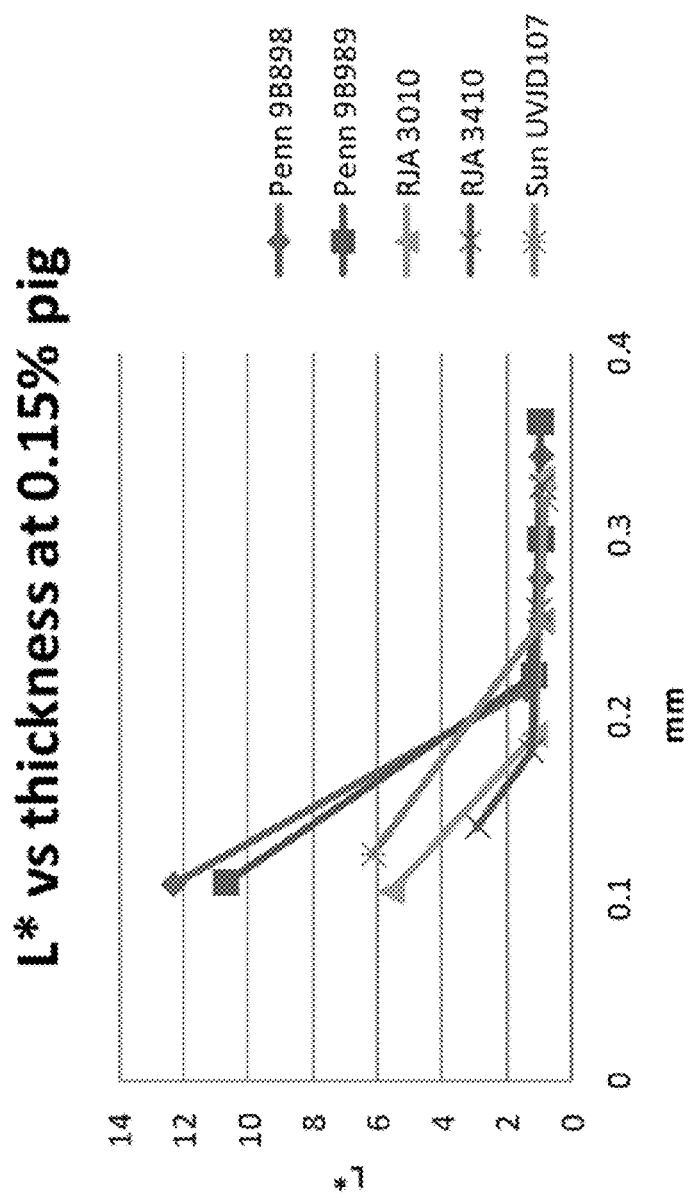
FIG. 3 illustrates plots of lightness versus layer thickness for various pigments dispersed in a carrier ink.

Cyan, yellow, and magenta pigment loads were designed to impart the maximum chromaticity at 0.3 mm and 0.15 mm layer thickness. For black-colored ink, the pigment load was chosen to impart the maximum optical density (OD) or the lowest lightness (L*). FIG. 2 illustrates plots of optical density versus layer thickness for various black-colored inks. FIG. 3 illustrates plots of lightness versus layer thickness for the same black-colored inks.

Additional results are provided in Table I below.

TABLE I

| Pigment Loading Amounts | | |
|---|---|---|
| Pigment | wt % for 0.30 mm colored layer | wt % for 0.15 mm colored layer |
| UVDJ354 (cyan, Sun Chemical) | 0.053 | 0.11 |
| UVDJ150 (yellow, Sun Chemical) | 0.069 | 0.14 |
| UVDJ322 (magenta, Sun Chemical) | 0.059 | 0.12 |
| UVDJ350 (yellow, Sun Chemical) | 0.060 | 0.12 |
| D3010-FX-Y150 (yellow, RJA Dispersions) | 0.041 | 0.082 |
| D3410-FX-Y150 (yellow, RJA Dispersions) | 0.051 | 0.10 |
| UVDJ107 (black, Sun Chemical) | 0.15 | 0.30 |
| D3410-FX-K (black, RJA Dispersions) | 0.15 | 0.30 |
| D3010-FX-K (black, RJA Dispersions) | 0.15 | 0.30 |
| 9B989 (black, Penn Colors) | 0.15 | 0.30 |
| 9B898 (black, Penn Colors) | 0.15 | 0.30 |

Example 2

Printed 3D Article

Figure 4:
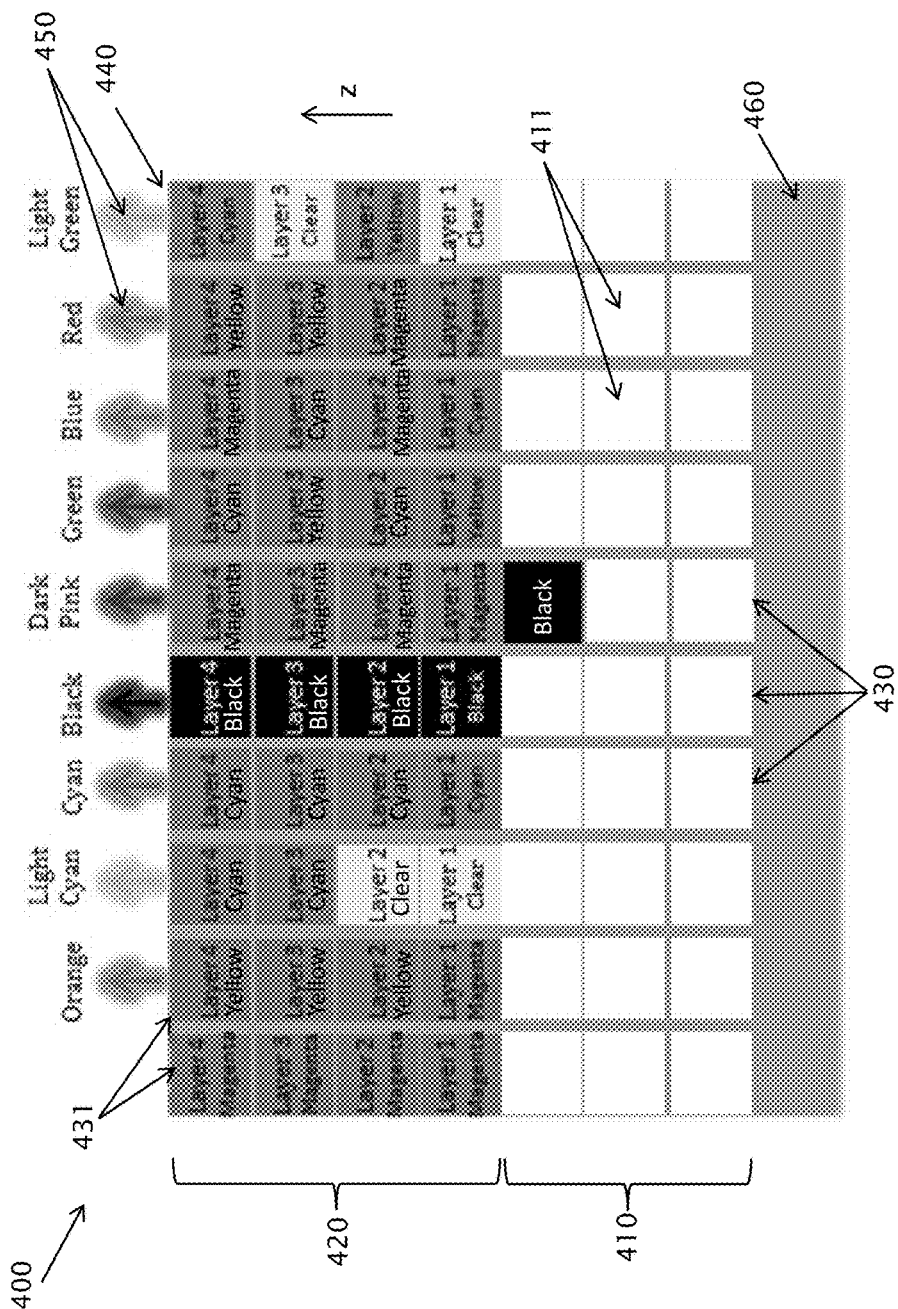
FIG. 4 illustrates schematically a sectional view of an article according to one embodiment described herein.

A printed 3D article according to one embodiment described herein was printed as illustrated in FIG. 4. With reference to FIG. 4, the article (400) comprises a core component (410) formed from a plurality of opaque white voxels (411) and a shell component (420) disposed over the core component (410) in a z-direction (z). The shell component (420) is defined by a plurality of columns (430) of voxels (431) substantially normal to a surface (440) of the article (400). The voxels (431) of the shell component (420) are formed from a composite ink described herein. In addition, at least some of the columns (430) of voxels (431) exhibit a surface color (450) resulting from a combination of the colors of a plurality of the underlying voxels (431). For example, the green surface color of the seventh column in FIG. 4 exhibits a green surface color (450) resulting from the combination of the underlying cyan and yellow voxels (431). Similarly, the dark pink surface color (450) of the sixth column results from the combination of the underlying magenta and black voxels (431).

As illustrated in FIG. 4, the core component (410) and the shell component (420) are disposed on a substrate (460). This substrate (460) can be the build pad of a 3D printing system or a previously deposited layer of build material or support material.

Further, it is to be understood that the surface (440) in FIG. 4 is only one exterior surface of the article (400), or one portion of one exterior surface of the article (400). Additionally, FIG. 4 presents a sectional view of the article (400).

All patent documents referred to herein are incorporated by reference in their entireties. Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

That which is claimed:

1. A method of printing a three-dimensional article comprising:
   selectively depositing layers of a composite ink in a fluid state onto a substrate,
   wherein the composite ink comprises an optically transparent or substantially transparent carrier ink comprising a curable material; and a colorant dispersed in the carrier ink in an amount of 0.01 to 5 weight %, based on the total weight of the composite ink,
   wherein a chroma of the composite ink at a given thickness of the composite ink is within 20% of a maximum chroma of the colorant in the composite ink, and
   wherein the carrier ink has an optical transparency of at least 80% transmission between 350 nm and 750 nm at a thickness of 0.01 to 10 mm.

2. The method of claim 1, wherein the layers of the composite ink have a thickness of about 0.03 to about 5 mm.

3. The method of claim 1, wherein the layers of the composite ink are deposited according to an image of the three-dimensional article in a computer readable format.

4. The method of claim 1 further comprising curing the layers of the composite ink.

5. The method of claim 1, wherein the colorant comprises a particulate pigment.

* * * * *